United States Patent [19]
Cave et al.

[11] Patent Number: 5,740,233
[45] Date of Patent: Apr. 14, 1998

[54] SYSTEM AND METHOD FOR STATISTICAL DIAGNOSIS OF THE OPERATION OF AN AUTOMATED TELEPHONE SYSTEM

[75] Inventors: Ellis K. Cave, Garland; Eric K. Weeren, Carrollton; David C. Cheng, Plano; Daren K. Wilson, McKinney, all of Tex.

[73] Assignee: InterVoice Limited Partnership, Reno, Nev.

[21] Appl. No.: 556,813

[22] Filed: Nov. 2, 1995

[51] Int. Cl.⁶ ................ H04M 15/00; H04M 15/06
[52] U.S. Cl. .............. 379/113; 379/134; 379/139; 379/265
[58] Field of Search ............... 379/34, 112, 113, 379/133, 134, 135, 136, 137, 139, 265, 266, 309

[56] References Cited

U.S. PATENT DOCUMENTS

5,214,688  5/1993  Szlam et al. .................. 379/112
5,425,087  6/1995  Gerber et al. ................. 379/113
5,465,286  11/1995 Clare et al. ................... 379/34

*Primary Examiner*—Curtis Kuntz
*Assistant Examiner*—Paul Loomis
*Attorney, Agent, or Firm*—Fulbright & Jaworski L.L.P.

[57] ABSTRACT

There is disclosed a system and method for monitoring the performance of a multi-line automated telephone system and detecting complete or intermittent faults on the incoming phone lines and in interactive applications accessed by the automated telephone device. The system gathers and analyzes statistical parameters associated with each incoming phone line and compares the parameters with those of other phone lines and with past statistical averages to detect out-of-tolerance lines. The system also gathers and analyzes statistical parameters associated with the execution of various applications and compares the parameters with past statistical averages to detect out-of-tolerance accesses to the applications.

50 Claims, 3 Drawing Sheets

SYSTEM AND METHOD FOR STATISTICAL DIAGNOSIS OF THE OPERATION OF AN AUTOMATED TELEPHONE SYSTEM

TECHNICAL FIELD OF THE INVENTION

This invention relates to a device for monitoring and diagnosing the performance of a multi-line automated telephone device, and in particular to a device for monitoring and diagnosing the operation of multiple telephone lines and interactive applications in an interactive voice response (IVR) environment.

BACKGROUND OF THE INVENTION

Automated telephone systems employing auto attendant features and/or interactive voice response applications are becoming increasingly popular as more and more businesses realize these systems' potential for reducing human operator costs and for increasing the number and diversity of services available to the public. This has correspondingly caused a great increase in the capacity and complexity of automated telephone systems.

While the exact configurations of these systems vary, the most common systems typically employ an interactive voice response (IVR) unit coupled to a large switch, such as a PBX, that interfaces with a large number of incoming telephone lines from the public telephone system. The IVR system also interfaces with enterprise data through database queries, and screen emulation techniques. The interactive voice response (IVR) units are capable of playing scripted messages to incoming callers, prompting the callers to enter DTMF keypad inputs to select among various services, and recognizing and decoding the corresponding DTMF inputs received from the caller. Information from the databases is spoken to the caller. More advanced automated telephone systems can place outbound calls using predictive dialers and employ voice recognition technology to analyze a person's spoken response to a scripted prompt to determine what service that person wishes to select. Still more advanced systems are capable of communicating with other computer systems via a modem connection. Finally, still other automated telephone systems are capable of sending and receiving facsimile (fax) transmissions.

Once received, the incoming call is typically directed by the IVR unit to one or more applications selected by the caller. These applications are too numerous and diverse to fully describe here. However, the more popular applications used by most customers pertain to bank account information, credit card account information, voice mail/voice messaging, catalog ordering, stock information, investment plan information (such as 401(k) plans), or entertainment services, such as pay-per-view. Additionally, as previously noted, some applications may be facsimile transmissions or computer communications via modem.

An IVR unit is typically coupled to a computer database system via a network, usually a Local Area Network (LAN). LAN systems are popular because they allow the IVR unit to access data and applications located in remote nodes. This is particularly true in those instances where a LAN interconnects separately owned businesses that subscribe to the network in order to obtain interactive voice response services that they might not be able to afford by themselves.

There are, however, numerous problems associated with the performance and reliability of these systems. This is especially true as the number of incoming telephone lines to an IVR unit increases. Frequently, a malfunctioning line connection to an IVR unit having many incoming telephone lines will go undetected for an extended period of time. One or more lines in a multi-line system may malfunction consistently or intermittently without being noticed by the owner/operator of the automated telephone system because the remaining properly functioning lines will continue to operate and allow the automated telephone system to function.

Before going on, it might be helpful to provide definitions for a few types of possible line distribution:

First available distribution passes the next call to the lowest numbered available line.

Round-robin distribution passes the next call to the idle line number next highest than the line to which the previous call was connected. This will sequence through all of the lines and eventually restart at the lowest line number.

Longest idle distribution passes the next call to the line in the group which has been idle the longest.

There are numerous ways in which telephone line connections can be faulty. The public telephone system may simply fail to deliver incoming telephone calls on a particular telephone line. This is a fault that is beyond the control of the automated telephone system owner/operator to detect. A malfunction in the automated telephone system may cause the IVR unit to answer an incoming line and immediately hang up without interacting with the customer. The customer may then simply call back and connect to a different incoming telephone line that is properly functioning. In such a case, the malfunction causing the first line to hang up rapidly will go unnoticed unless the customer makes a complaint, which is unlikely.

Another type of error that may occur is that the telephone connection will fail to disconnect when the customer hangs up. In such a case, the line will be held open by the interactive voice response unit for an extended period of time, perhaps even hours. Other possibilities are that an incoming call on a particular line will continually receive either a busy signal or endless ringing without an answer by the interactive voice response unit, or will be noisy.

In all of the foregoing situations, the commercial business owning an IVR unit or the service provider selling IVR services to third parties will not become aware of these problems unless and until a noticeable drop-off in the capacity or through-put of the automated telephone system occurs, or customers complain that they attempted to use the system and the system rang without answering, or prematurely disconnected during the phone call. The latter case is unlikely because the customers usually call back a second time, connect with a properly functioning line, and disregard the malfunctioning connection.

Furthermore, while a consistent failure of a single line in a multi-line system may often go unnoticed for an extended period of time, it is at least possible, in most cases, to diagnose such consistent failures by running self-test programs on the automated telephone system. But, in the case of an intermittent failure of a telephone line, it is quite often impossible to detect the fault.

An additional source of error in automated telephone systems can occur in the application modules driving the interactive voice response unit. There are numerous hardware and software sources of error that can cause a particular application to fail intermittently during routine operation. These intermittent failures of applications are particularly difficult to detect because the fault does not always occur on the same incoming telephone line. Therefore, a fault with the application cannot be detected by merely trouble-shooting the telephone lines connected to the IVR unit.

This situation is particularly exacerbated in those cases where malfunctioning application modules may not be on the same system as the IVR server or an IVR service provider connects through a network to third party subscribers. The service provider typically has no control over the quality of the software and hardware used by the network subscriber. In such a case, the ability of the service provider to detect and correct a fault in the application, or alert the subscriber to the fault, is very limited.

There is therefore a need for systems and methods for verifying the operation of a multi-line automated telephone system and detecting complete and/or intermittent faults within such a system even though there are no outward manifestations of such faults.

There is a further need for systems and methods for monitoring telephone lines coupled to a multi-line automated telephone system and detecting both complete and intermittent faults in the telephone line connections.

There is a still further need in the art to provide systems and methods for monitoring the execution of application modules that interact through an interactive voice response unit and for detecting both complete and intermittent faults in the application modules.

SUMMARY OF THE INVENTION

These and other problems inherent in the prior art have been solved by providing a statistical health monitor associated with an interactive voice response (IVR) unit that compiles and analyzes statistical parameters related to the operation of telephone lines connected to the interactive voice response system. The statistical health monitor of the present invention also compiles and analyzes operational parameters associated with the execution of application modules associated with the interactive voice response unit.

In one embodiment of the present invention, a statistical engine monitors incoming telephone lines and calculates the incoming call rate of telephone calls being handled by the IVR unit in a first available distribution across multiple telephone lines connected to the public telephone system.

In another embodiment of the present invention, a statistical engine monitors incoming telephone lines and calculates the incoming call rate of telephone calls being handled by the IVR unit in a round-robin distribution service across multiple telephone lines connected to the public telephone system.

In a further embodiment of the present invention, a statistical engine monitors incoming telephone lines and calculates the number of telephone calls falling below a minimum threshold duration or exceeding a maximum threshold duration on a line-by-line basis across multiple telephone lines.

In all of the foregoing embodiments, the key parameters monitored by the present invention are call arrival rate and the duration of each call. The present invention detects intermittent faults on a particular line by comparing the statistical parameters of that line with the preceding and/or following telephone lines, or against any other or all other telephone lines in both rotary distribution and in sequential distribution service. Furthermore, the present invention can diagnose intermittent faults in a particular telephone line by comparing the statistical parameters of that line with the statistical parameters of a corresponding line in a "model distribution" for either a rotary distribution or a sequential distribution service.

It is a technical advantage of the present invention that a statistical engine monitors the instances of each application module accessed by the IVR unit, both locally and through a network, and calculates the operational parameters associated with those application modules. The statistical health monitor of the present invention records the start time and stop time of each execution of an application module and develops a usage profile for each application module based on the average duration of the accesses to each application module. If the average duration of each access to an application module increases or decreases dramatically, the present invention diagnoses the change as a fault and sets an alarm or flag accordingly.

It is another technical advantage of the present invention that it also detects application module accesses that fall below a minimum threshold duration or exceed a maximum threshold duration and sets an alarm or flag accordingly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
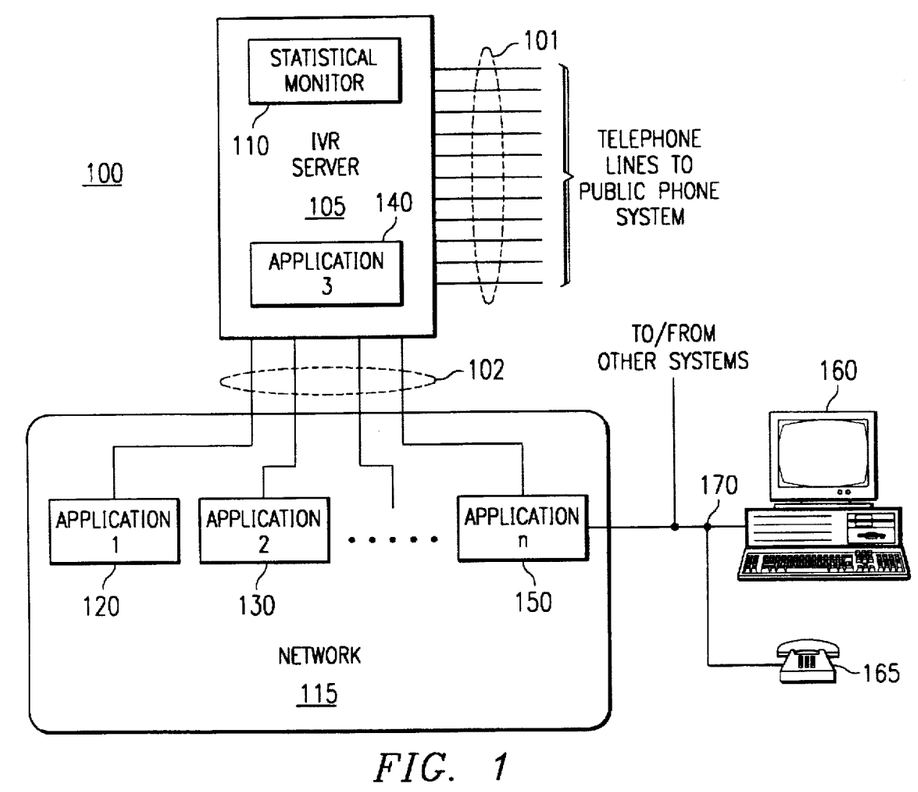
FIG. 1 is a system block diagram of an interactive voice response telephone system employing a statistical health monitor in accordance with the present invention.

FIG. 1 depicts an automated telephone system 100 coupled to the public telephone system through a group of telephone lines 101. Incoming telephone lines 101 are connected to interactive voice response server 105. Interactive voice response (IVR) server 105 is coupled by connections 102 to computer network 115. Associated with interactive voice response (IVR) server 105 is statistical health monitor 110 in accordance with the present invention. It may or may not be in the box. Incoming calls received on telephone lines 101 may access Application 1 through Application N, shown as items 120, 130, 140 and 150, through IVR server 105. These applications may include access to a human telephone agent coupled by connection 170 to network 115. Typically, the telephone agent uses computer terminal 160 and voice telephone 165 to communicate with a caller on telephone lines 101.

As shown in FIG. 1, Applications 1–N can be distributed at numerous nodes throughout network 115 or may be resident within IVR server 105. Additionally, a telephone agent using voice telephone 165 and computer terminal 160 may be coupled to IVR server 105 through network 115, as shown in FIG. 1, or may be coupled directly to IVR server 105 (not shown).

Statistical health monitor 110 has the ability for monitoring telephone lines 101 to detect the initiation of an incoming telephone call on any of telephone lines 101 and to detect the termination of each said incoming call. Statistical health monitor 110 also has the ability for recording the start time and stop time of each incoming call received on telephone lines 101, calculating the duration of each said call, and calculating and maintaining other statistical parameters on a line-by-line basis for each one of telephone lines 101. Statistical parameters are maintained for each line, including the total number of calls received on each line, individual call duration, average call duration, and call arrival rate (i.e., number of calls per unit of time).

Statistical health monitor 110 also contains circuitry for monitoring each access to an application by IVR server 105 and for calculating statistical parameters associated with the applications on an application-by-application basis. Statistical health monitor 110 records the start time and stop time of each execution of an application, calculates the duration of each access to the application, calculates and updates the average duration of the accesses to a particular application.

Figure 2A:
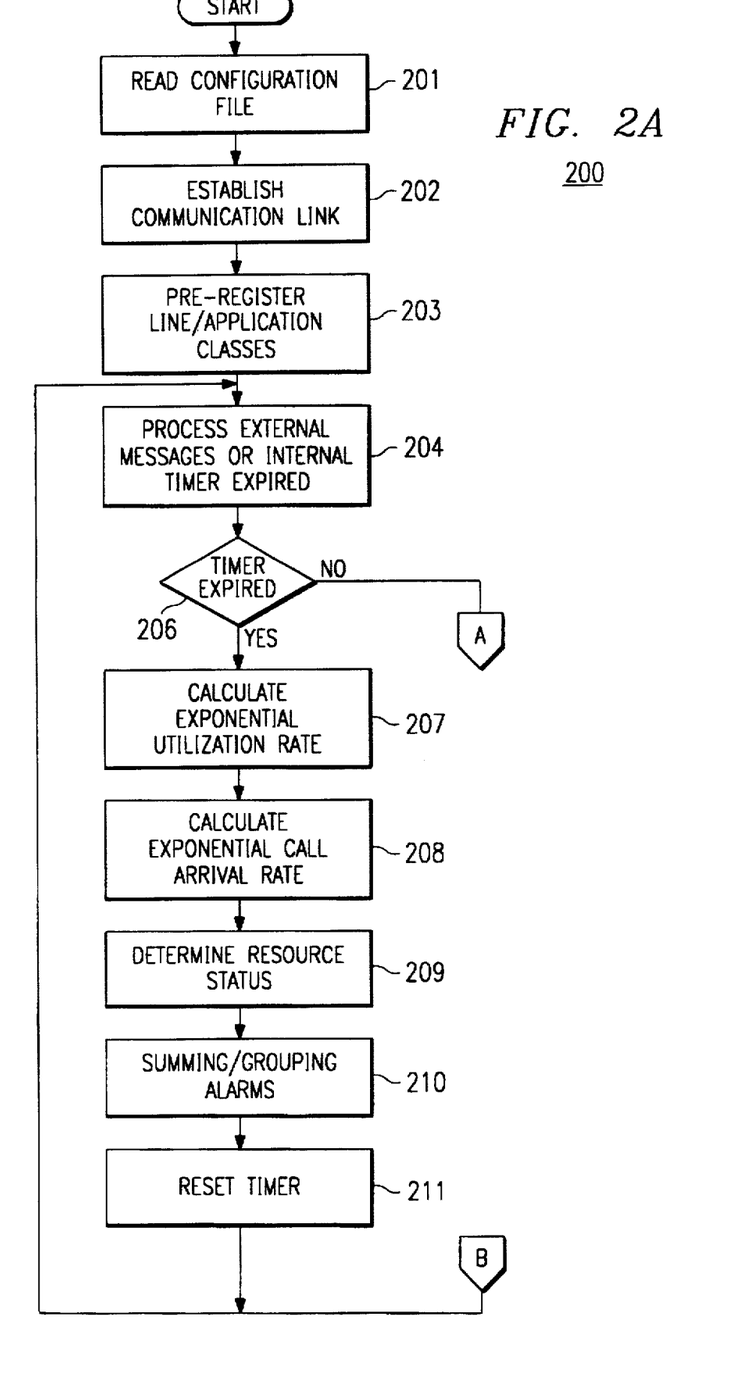
FIGS. 2A and 2B are a logical flow diagram of the operations of the present invention.
Figure 2B:
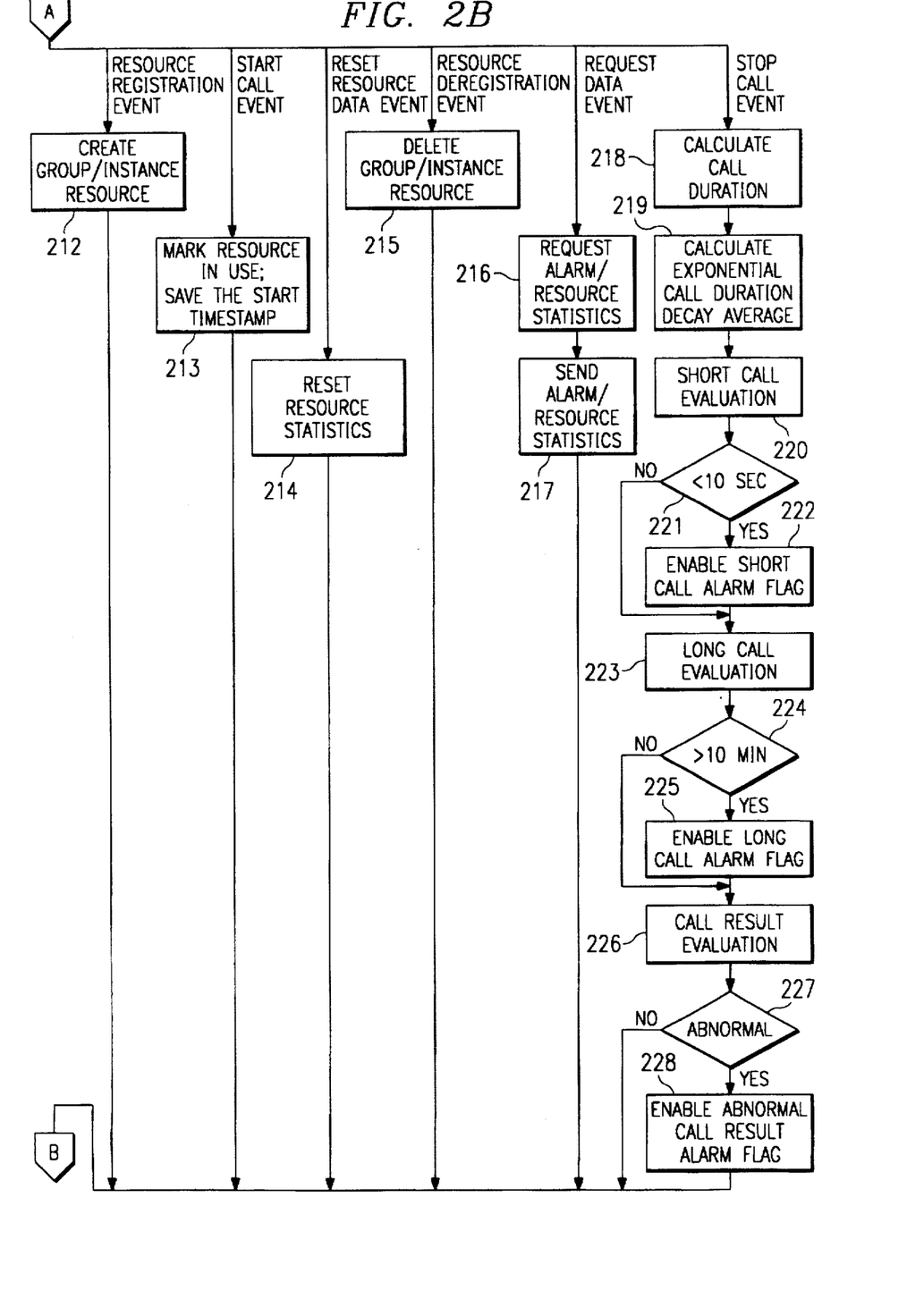
Figure 3:
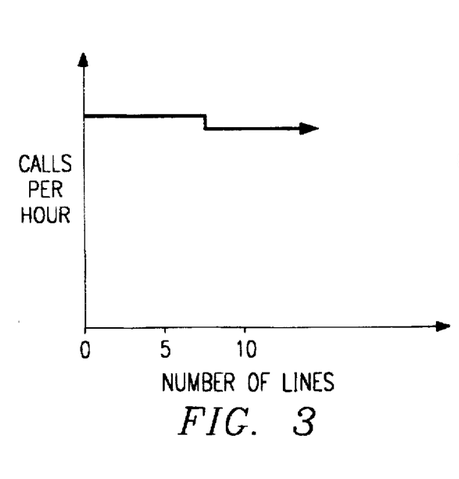
FIG. 3 is a graph of the call distribution of incoming calls across multiple phone lines in a round-robin distribution phone system.
Figure 4:
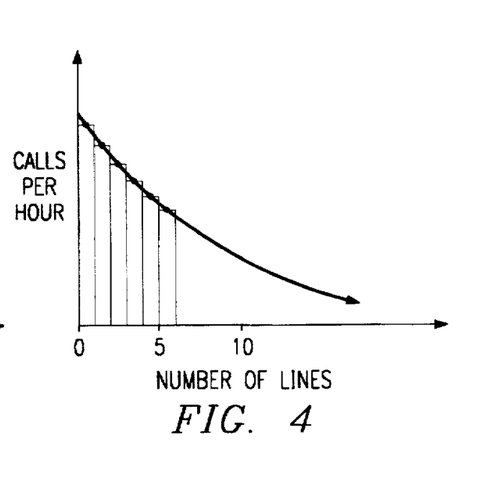
FIG. 4 is a graph of the call distribution of incoming calls across multiple phone lines in a first available distribution phone system.

Before discussing the logical flow diagram illustrated in FIGS. 2A and 2B, attention is drawn to FIGS. 3 and 4 which illustrate the distribution of incoming telephone calls in a rotary (round robin) distribution and a first available distribution, respectively. Incoming telephone calls may be received from the public telephone company in either of these modes, as selected by the customer.

In the rotary distribution illustrated in FIG. 3, incoming calls are directed to individual telephone lines in an evenly rotating manner, without giving priority to particular lines. The first incoming telephone call is directed to Line 1, the second incoming call is directed to Line 2, the third incoming call is directed to Line 3, and so forth, until the last telephone line in the multi-line system has received a call. The next incoming call is directed to by Line 1, if available. If Line 1 is not available, the incoming call will be sent to the next available line in ascending order.

In a rotary distribution to an automated telephone system having thirty incoming telephone lines, the first thirty incoming calls received will be distributed from Line 1 to Line 30 in ascending order. Assuming that each incoming telephone call is relatively short in duration and that the incoming calls are spaced relatively far apart, Line 1 will be idle when the 31st incoming call is received and the following incoming calls will continue to be distributed in order to Line 2, Line 3, Line 4, etc. In this manner, incoming calls are distributed evenly across all incoming telephone lines.

If the incoming calls have an arrival rate of 300 calls per hour, then each line receives 10 calls per hour (still assuming 30 lines). If incoming calls are received at a high rate and a particular line is occupied by a single call for an extended period of time, that line will be skipped if it is still busy when its next turn comes around in the rotary distribution. However, over an extended period of time, long duration calls will be randomly, and therefore evenly, distributed across all of the incoming telephone lines and the call distribution will be approximately even across all telephone lines, as shown in FIG. 3.

The alternative service to rotary distribution is sequential distribution, wherein incoming calls are directed to telephone lines of the highest priority first, if those lines are available. In a sequential distribution, the first incoming call is directed to Line 1, and the following incoming calls are directed to the other telephone lines in ascending numerical order, provided that no telephone line having a lower numerical value is idle.

For example, if Line 1 receives the first incoming telephone call and the next two calls are received while Line 1 is still busy, the next two incoming calls are directed to Line 2 and Line 3, respectively. However, if a fourth incoming call is received after Line 1 has become idle, the fourth incoming call will be directed to Line 1, not Line 4. If a fifth incoming call is received while Lines 1–3 are busy, the fifth incoming call will be directed to Line 4. If, however, Line 1, Line 2, or Line 3 has become available when the fifth incoming call is received, the fifth incoming call will be directed to the now available line, and not to Line 4. In this manner, the distribution of incoming telephone calls is heaviest on Line 1 and lightest on Line 30 in a thirty line automated telephone system.

An example of the distribution of incoming telephone calls in a sequential distribution is shown in FIG. 4, which has the characteristic of a decaying exponential curve. The rate at which the decaying exponential curve drops off depends upon the average duration of each telephone call and the arrival rate of incoming telephone calls.

If the average duration of each telephone call is very short and the arrival rate of incoming calls is low, the first few lines will be able to handle all of the incoming calls and the exponential curve will have a sharply decreasing slope. Line 1 will handle the greatest number of calls, with a sharp drop off to Line 2, which will in turn have a sharp drop off to Line 3. Lines 4 and above will rarely, if ever, be needed when the call arrival rate is very low and the average duration of each call is short.

If, however, the call arrival rate is very high and the average duration of each call is comparatively long, then more calls will be distributed to higher numerical lines and the downward slope of the decaying exponential curve will be much more gradual.

In either a round-robin distribution or a first available distribution, if all thirty lines are busy when a thirty-first call is received, the thirty-first incoming telephone call will be placed on hold by automated telephone system 100.

It should be noted that the decaying exponential curve in FIG. 4 may be readily calculated using well known math algorithms whenever both the call arrival rate and the average call duration rate are known. Thus, it is possible to predict the number of calls per hour received on any line in the multi-line system whenever the call arrival rate and the average call duration are known. As will be seen below, this ability to estimate the call volume on each line may be used to diagnose the health of each available line.

Returning now to FIGS. 2A and 2B, the logical flow diagram of the statistical health monitor of the present invention is illustrated. In FIGS. 2A and 2B, applications and telephone lines are referred to collectively as "resources." The algorithms involved in developing statistical parameters to diagnose the operations of the incoming telephone lines and the applications accessed by IVR server 105 are largely the same. Both can therefore be addressed in a single flow chart, as shown in FIGS. 2A and 2B. Resources are designated by class as either a line or an application. Within each class, there may be groups. For example, a group may consist of one or more trunk lines and the group may be either round-robin distribution lines, first available sequential distribution lines, or longest idle distribution lines where IVR server 105 receives both types of distributions.

Statistical health monitor 110 determines the health of IVR server 105 by determining (1) the health of each line; and (2) the health of each application. To determine the health of each incoming telephone line, statistical health monitor 110 determines the normal operation of the incoming telephone lines from the public telephone system and the corresponding normal distribution of incoming calls. Statistical health monitor 110 then develops statistical parameters for line utilization, call duration and call arrival rate. Statistical monitor 110 evaluates individual call durations in order to set short call alarms and long call alarms, and counts incoming calls per unit time in order to set abnormal call arrival rate alarms. Statistical monitor 110 may also receives call result error codes from the public telephone system which indicate faults occurring on particular lines during outbound and inbound calls.

In determining the health of an application, statistical health monitor 110 evaluates individual application access durations in order to set short access duration alarms, long access duration alarms, and an abnormal access duration average alarm. Additionally, statistical monitor 110 receives application result error codes from the applications and from network 115 whenever an error occurs in the execution of an application.

Upon initialization, statistical health monitor 110 obtains configuration information associated with IVR server 105 in order to determine the number of incoming telephone lines, the type of call distribution, and the number and type of applications accessible to IVR server 105. Statistical health monitor 110 then determines the incoming line and application classes (Steps 201–203 in FIG. 2A). Next, statistical health monitor 110 processes any external error messages that have been received and verifies whether or not the internal timer has expired on a resource event (Steps 204 and 205 in FIG. 2A).

Four events are required to be received in order to calculate the statistical parameters: (1) Resource Registration Event, (2) Resource Deregistration Event, (3) Resource Start Event, and (4) Resource Stop Event. (Steps 212, 213, 215, and 218 in FIG. 2B.)

A Resource Registration Event informs statistical health monitor 110 that a new resource (telephone line or application) needs to be added to the calculations. Resource Registration Events include an Event ID, Resource Type, and Resource ID.

A Resource Deregistration Event informs statistical health monitor 110 that a resource needs to be removed from the calculations. Resource Deregistration Events include an Event ID, Resource Type, and Resource ID.

A Resource Start Event informs statistical health monitor 110 that a resource is allocated. Resource Start Events include an Event ID, Resource Type, Resource ID, and Start TimeStamp.

A Resource Stop Event tells statistical health monitor 110 when a resource is released. Resource Stop Events include an Event ID, Resource Type, Resource ID, Start TimeStamp, Stop TimeStamp, and a Result Code.

There are three principal statistical parameters used to determine the health conditions of a system resource. These statistical parameters are: utilization average, call/access duration, and call arrival (usage) rate. All statistical parameters calculated by the present invention use an exponentially decaying average method. The exponential decay average behaves like a windowed average, with a $\delta$ value determining the equivalent window size. The benefit of an exponential decay average is that large amounts of historical data can be automatically dropped off and recent data are the most heavily weighted. The following is a brief explanation of the algorithms involved in calculating some of the relevant statistical parameters.

The duration average, $A(t)$, is the average amount of time that the resource (line or application) has been in use. $A(t)$ is given by:

$$A(t)=\delta *A(t-1)+(1-\delta)*X$$

where $A(t-1)$ is the last average value, $A(t)$ is the new average value, X is the resource in-use time in seconds, T is the sampling time interval value, and $\delta$ is the window size factor (default=0.95). For the case $A(0)$, the initial value will be set to the first exponential call/access duration result and the next three call/access duration results will use $\delta$=0.50 to perform the calculation.

The utilization average, $A(t)/T$, is the percentage of the time that the resource has been in use. $A(t)$ is given by:

$$A(t)=\delta *A(t-1)+(1-\delta)*L(t)$$

where $A(t-1)$ is the last average value, $A(t)$ is the new average value, $L(t)$ is the time in use after the last interval, T is the sampling time interval value, and $\delta$ is the window size factor (default=0.95). For the case $A(0)$, the initial value will be set to the first exponential average result and the next three results will use $\delta$=0.50 to perform the calculation.

The call arrival (usage) rate average, $A(t)*3600/T$, is a measure of how frequently a line is put into use per hour and is given by:

$$A(t)=\delta *A(t-1)+(1-\delta)*W$$

where $A(t-1)$ is the last average value, $A(t)$ is the new average value, W is the number of calls received after the last interval, T is the sampling time interval value, and $\delta$ is the window size factor (default=0.95). For the case $A(0)$, the initial value will be set to the first exponential call arrival rate result, and the next three results will use $\delta$=0.50 to perform the calculation.

Steps 218–228 of FIG. 2B illustrate the sequence of calculations performed by statistical health monitor 110. In Steps 218–228, a "call" may be an actual telephone call received on a particular incoming telephone line, or an "access" to an application by IVR server 105. For the purpose of simplicity, "call" is used for both application accesses and incoming telephone calls.

Statistical health monitor 110 maintains a "result window" covering the last ten results received by statistical health monitor 110 for a particular incoming telephone line, or a particular application. If the current result of call duration on a specific telephone line is too short (less than 10 seconds) then statistical health monitor 110 gives a short call alarm for that line. If the current result of call duration on a specific call is too long (more than 10 minutes), and three such occurrences have occurred within the last ten results, statistical health monitor 110 generates a long call alarm for that specific telephone line. Furthermore, if the call duration result is too long (more than 10 minutes) and is the second of two consecutive call durations in excess of 10 minutes, statistical health monitor 110 generates a long call alarm for that telephone line.

In a similar manner, statistical health monitor 110 can generate a short call alarm for an application whenever three call results are too short (less than 10 seconds) during the last 10 results in the moving result window. The statistical health monitor 110 can generate a long call alarm whenever three call results are too long (more than 10 minutes) during the last ten results in the moving result window across a group of monitored lines. Statistic health monitor 110 also generates a long call alarm for an application whenever two consecutive accesses to an application exceed more than 10 minutes across a group of monitored lines.

Statistical health monitor 110 also receives result codes from IVR server 105 and telephone lines 101. Statistical health monitor 110 generates call result error alarms for both telephone lines and applications whenever the current result of a system call result returns an error for the result code and three such errors have occurred within the last ten results.

Statistical health monitor 110 also generates an alarm if the call arrival rate on a specific line is significantly different from its adjacent active lines in either a rotary distribution or a sequential distribution. Depending on the exponential weight used and the amount of activity on telephone lines 101, the tolerance for a particular telephone line may vary from +/−50% of the two adjacent active line averages or as little as a few percent of the two adjacent active line averages.

It is possible to compare the call arrival rate on a particular telephone line with the two adjacent active lines in both a rotary and a sequential distribution. In a rotary distribution, all telephone lines are expected to have approximately the same number of calls per hour. Therefore, taking the average of the preceding and following active lines (which should be approximately equal) will yield the average for all of the incoming telephone lines, including the particular line in consideration.

In a sequential distribution, the preceding line and the following line are expected to have call arrival rates higher and lower, respectively, than the line in the middle. However, since the call arrival rate on the middle line is generally close to the midpoint between the higher value on the preceding line and the lower value on the following line, averaging the preceding and following lines will yield an average close to the value expected to be found on the middle line. Therefore, in round-robin distributions, the expected value on a particular line may be roughly calculated by taking the average of the call arrival rates on all lines. The expected value for a particular line in first available distributions is calculated by taking the average of the call arrival rates on the preceding and following lines.

As noted previously, in the case of a first available distribution, it is possible to estimate the expected call arrival rate on any line in multi-line system whenever the call arrival rate and the average call duration are known. If the call arrival rate and average call duration are known, it is possible to derive a "model" first available distribution as shown in FIG. 4. The actual measured call arrival rates on each incoming telephone line in the telephone system are then compared to the estimated value in the "model" distribution.

Once statistical health monitor 110 determines that an incoming telephone line or an application is out-of-tolerance and generates a corresponding alarm, statistical health monitor 110 can relay the alarm to the owner/operator or maintenance provider of IVR server 105. The alarm may be indicated by a simple indicator light on IVR server 105 or may be a data message transmitted to a computer terminal coupled to IVR server 105 directly or through network 115. Alternatively, statistical health monitor 110 may cause IVR server 105 to generate an outbound telephone call on telephone lines 101 to a remotely located computer terminal or a voice message service.

In addition to diagnosing faults by comparing call arrival rates of adjacent lines and counting long calls and short calls occurring within a fixed-size call window, statistical health monitor 110 can, in certain cases, compare statistical parameter averages of telephone lines 101 (whether adjacent or not) to diagnose faults. If automated telephone system 100 serves only a single type of application (such as bank account balance information), it is reasonable to expect that all calls received by automated telephone system 100 will be tolerably close to a specified average duration. The same may also be true if automated telephone system 100 serves a limited number of different applications that nonetheless have similar average call durations. In either of these relatively limited cases, statistical health monitor can diagnose faults on telephone lines 101 by comparing individual line averages of line utilization and call duration with the composite averages for all telephones lines 101 in the automated telephone system 100.

The same type of problem exists on outbound calls when they are part of an IVR. For example, calls can be placed and experience early termination, or non-completion, or a number of other malfunctions. This can be determined by a statistical measure against a norm, as discussed above. Also the detection of errors can be based on a statistical model which may be modified based on measured parameters or anticipated different parameters, all under the control of the system.

Although the present invention and its advantages have been described in detail, it should be understood that various changes, substitutions and alterations can be made herein without departing from the spirit and scope of the invention as defined by the appended claims.

What is claimed is:

1. An apparatus for diagnosing the operation of an automated telephone system coupled to a plurality of telephone lines, said apparatus comprising:

line monitoring apparatus for detecting an initiation and a termination of each call on each of said telephone lines coupled to said automated telephone system, measuring a duration of each said call, and counting a total number of calls on a line-by-line basis; and a processor coupled to said line monitoring circuitry for 1) calculating a first selected statistical parameter for a first selected one of said telephone lines, and 2) comparing said first selected statistical parameter to a selected average of a corresponding second selected statistical parameter of a second selected telephone line and a corresponding third selected statistical parameter of a third selected telephone line, and 3) generating a system alarm corresponding to said first selected telephone line whenever a difference between said first selected statistical parameter and said selected average of said corresponding second and third selected statistical parameters exceeds a maximum tolerance value.

2. The apparatus as set forth in claim 1 wherein said second selected telephone line and said third selected telephone line precede and follow, respectively, said first selected telephone line in a predetermined distribution order of said incoming calls.

3. The apparatus as set forth in claim 2 wherein said predetermined distribution order is a first available distribution order.

4. The apparatus as set forth in claim 2 wherein said predetermined distribution order is a round-robin rotary distribution order.

5. The apparatus as set forth in claim 1 wherein at least one of said averages calculated by said control processor is a weighted average.

6. The apparatus as set forth in claim 1 wherein said predetermined distribution order is longest idle.

7. The apparatus as set forth in claim 1 wherein said first selected statistical parameter is a call arrival rate average of said first selected telephone line.

8. The apparatus as set forth in claim 7 wherein said call arrival rate average is given by the formula $$A(t)=\delta*A(t-1)+(1-\delta)*W$$

where A(t−1) is the last average value, A(t) is the new average value, W is the number of calls received after the last interval, T is the sampling time interval value, and δ is the window size factor (default=0.95).

9. The apparatus as set forth in claim 1 wherein said first selected statistical parameter is a call duration average of said first selected telephone line.

10. The apparatus as set forth in claim 9 wherein said call duration average is given by the formula $$A(t)=\delta*A(t-1)+(1-\delta)*X$$

where A(t−1) is the last average value, A(t) is the new average value, X is the resource in-use time in seconds after the last interval, T is the sampling time interval value, and δ is the window size factor (default=0.95).

11. The apparatus as set forth in claim 1 wherein said first selected statistical parameter is a line utilization average of said first selected telephone line.

12. The apparatus as set forth in claim 11 wherein said line utilization average is given by the formula $$A(t)=\delta*A(t-1)+(1-\delta)*L(t)$$

where A(t−1) is the last average value, A(t) is the new average value, L(t) is the time in use after the last interval, T is the sampling time interval value, and δ is the window size factor (default=0.95).

13. The apparatus as set forth in claim 1 wherein said processor sends said system alarm to a remote monitor.

14. The apparatus as set forth in claim 13 wherein said processor sends said calculated data to a remote monitor.

15. The apparatus as set forth in claim 1 wherein said control processor sends said system alarm to a remote station by causing said automated telephone system to initiate an outbound telephone call to said remote station.

16. The apparatus as set forth in claim 1 wherein said processor sends said calculated data to a remote monitor for comparison of like calculated data from at least one other system prior to generating said system alarm.

17. The apparatus as set forth in claim 1 wherein said calls are incoming to said telephone system.

18. The apparatus as set forth in claim 1 wherein said calls are outgoing from said telephone system.

19. An apparatus for diagnosing the operation of an automated telephone system coupled to a plurality of telephone lines, said apparatus comprising:

line monitoring circuitry for detecting an initiation and a termination of each incoming call to said telephone system on each of said telephone lines, measuring a duration of each said incoming call, and counting a total number of incoming calls received on a line-by-line basis;

means for comparing each said duration of each said incoming call on a first selected telephone line to a maximum threshold duration and to a minimum threshold duration; and means for generating a signal if more than a predetermined number of the last N incoming calls fall below said minimum threshold duration or exceed said maximum threshold duration.

20. The apparatus as set forth in claim 19 wherein said signal generating means further comprises means for generating a short call alarm if said predetermined number is three which fall below said minimum threshold duration.

21. The apparatus as set forth in claim 19 wherein said signal generating means further comprises means for generating a long call alarm if more than three of the last ten incoming calls exceed said maximum threshold duration.

22. The apparatus as set forth in claim 19 wherein said signal generating means further comprises means for generating a call result error alarm if two consecutive incoming calls exceed said maximum threshold duration.

23. The apparatus as set forth in claim 19 further including means for sending said signal to a computer terminal coupled to said automated telephone system.

24. The apparatus as set forth in claim 19 further including means for sending said signal to a remote station by causing said automated telephone system to initiate an outbound telephone call to said remote station.

25. An apparatus for diagnosing the operation of an automated telephone system coupled to a plurality of telephone lines, wherein incoming call are received in a sequential distribution across said plurality of telephone lines, said apparatus comprising:

line monitoring circuitry for detecting an initiation and a termination of each incoming call on each of said telephone lines, measuring a duration of each said incoming call, and counting a total number of incoming calls received on a line-by-line basis; and a control processor coupled to said line monitoring circuitry for 1) calculating a system call duration average for all said incoming calls, 2) calculating a system call arrival rate for all said incoming calls, 3) calculating an expected call distribution of said incoming calls on each of said telephone lines based on said system call duration average and said system call arrival rate, 4) comparing a first expected call distribution of a first selected telephone line to an actual call distribution of incoming calls on said first selected telephone line and 4) generating a system alarm corresponding to said first selected telephone line if a difference between said first expected call distribution and said actual call distribution exceeds a maximum value.

26. The apparatus as set forth in claim 25 wherein at least one of said averages calculated by said control processor is a weighted average.

27. The apparatus as set forth in claim 25 wherein said control processor sends said system alarm to a computer terminal coupled to said automated telephone system.

28. The apparatus as set forth in claim 25 wherein said control processor sends said system alarm to a remote station by causing said automated telephone system to initiate an outbound telephone call to said remote station.

29. A method of diagnosing the operation of an automated telephone system coupled to a plurality of telephone lines, the method comprising the steps of:

monitoring the plurality of telephone lines to detect an initiation and a termination of each incoming call on each of the telephone lines;

measuring the duration of each of the incoming calls;

counting a total number of incoming calls received on each line;

calculating a first selected statistical parameter for a first selected one of the telephone lines;

comparing the first selected statistical parameter to a selected average of a corresponding second selected statistical parameter of a second selected telephone line and a corresponding third selected statistical parameter of a third selected telephone line, wherein the second selected telephone line and the third selected telephone line precede and follow, respectively, the first selected telephone line in a predetermined distribution order of the incoming calls; and generating a system alarm whenever a difference between the first selected statistical parameter and the selected average of the corresponding second and third selected statistical parameters exceeds a maximum tolerance value.

30. The method as set forth in claim 29 wherein the predetermined distribution order is a sequential distribution order.

31. The method as set forth in claim 29 wherein the predetermined distribution order is a rotary distribution order.

32. The method as set forth in claim 29 wherein the first selected statistical parameter is a weighted average.

33. The method as set forth in claim 29 wherein the first selected statistical parameter is a call arrival rate of the first selected telephone line.

34. The method as set forth in claim 29 wherein the first selected statistical parameter is a call duration average of the first selected telephone line.

35. The method as set forth in claim 29 wherein the first selected statistical parameter is a line utilization average of the first selected telephone line.

36. The method as set forth in claim 29 further including the step of sending the system alarm to a computer terminal coupled to the automated telephone system.

37. The method as set forth in claim 29 further including the step of sending the system alarm to a remote station by causing the automated telephone system to initiate an outbound telephone call to the remote station.

38. A method of diagnosing the operation of an automated telephone system coupled to a plurality of telephone lines, the method comprising the steps of:

monitoring the plurality of telephone lines to detect an initiation and a termination of each incoming call on each of the telephone lines;

measuring the duration of each of the incoming calls;

counting a total number of incoming calls received on each line;

comparing each duration of each incoming call on a first selected telephone line to a maximum threshold duration and to a minimum threshold duration; and generating a system alarm if more than a predetermined number of the last N incoming calls fall below the minimum threshold duration or exceed the maximum threshold duration.

39. The method as set forth in claim 38 wherein the step of generating a system alarm comprises the step of generating a short call alarm if more than three of the last ten incoming calls fall below the minimum threshold duration.

40. The method as set forth in claim 38 wherein the step of generating a system alarm comprises the step of generating a long call alarm if more than three of the last ten incoming calls exceed the maximum threshold duration.

41. The method as set forth in claim 38 wherein the step of generating a system alarm comprises the step of generating a long call alarm if two consecutive incoming calls exceed the maximum threshold duration.

42. The method as set forth in claim 38 including the further step of sending the system alarm to a computer terminal coupled to the automated telephone system.

43. The method as set forth in claim 38 including the further step of sending the system alarm to a remote station by causing the automated telephone system to initiate an outbound telephone call to the remote station.

44. A method of diagnosing the operation of an automated telephone system coupled to a plurality of telephone lines, wherein incoming call are received in a sequential distribution across the plurality of telephone lines, the method comprising the steps of:

monitoring the telephone lines to detect an initiation and a termination of each incoming call on each telephone line;

measuring a duration of each incoming call;

counting a total number of incoming calls received on each telephone line on a line-by-line basis;

calculating a system call duration average for all incoming calls;

calculating a system call arrival rate for all incoming calls;

calculating an expected call distribution of the incoming calls on each of the telephone lines based on the system call duration average and the system call arrival rate;

comparing a first expected call distribution of a first selected telephone line to an actual call distribution of incoming calls on the first selected telephone line; and generating a system alarm corresponding to the first selected telephone line if a difference between the first expected call distribution and the actual call distribution exceeds a maximum value.

45. The method as set forth in claim 44 wherein at least one of the values calculated is a weighted average.

46. The method as set forth in claim 44 including the further step of sending the system alarm to a computer terminal coupled to the automated telephone system.

47. The method as set forth in claim 44 including the further step of sending the system alarm to a remote station by causing the automated telephone system to initiate an outbound telephone call to the remote station.

48. An apparatus for diagnosing the operation of an automated telephone system coupled to a plurality of telephone lines, said apparatus comprising:

line monitoring apparatus for detecting an initiation and a termination of each call on each of said telephone lines coupled to said automated telephone system, measuring a duration of each said call, and counting a total number of calls on a line-by-line basis; and a processor for calculating a first selected statistical parameter for a selected one of said telephone lines;

means for sending said calculated first selected statistical parameter to a monitoring point operating in common with at least two other automated telephone systems, said monitoring point operative to receive like calculated selected statistical parameters from such other systems;

means for determining when a sent calculated statistical parameter from said system statistically varies from the combined like sent statistical parameters of said other systems; and means controlled by said determining means when a said variation is deleted for establishing an alarm condition.

49. The invention set forth in claim 48 wherein said statistical parameter is a measure of line utilization for incoming calls.

50. The invention set forth in claim 48 wherein said statistical parameter is a measure of call duration on each call.

* * * * *